(12) United States Patent
Lavigne et al.

(10) Patent No.: US 10,190,565 B2
(45) Date of Patent: Jan. 29, 2019

(54) METHOD OF REFURBISHING AN ENERGY CONVERSION FACILITY AND REFURBISHED ENERGY CONVERSION FACILITY

(71) Applicant: ALSTOM Renewable Technologies, Grenoble (FR)

(72) Inventors: Sylvain Daniel Lavigne, Chirens (FR); Claude Beral, Veurey Voroize (FR); Sylvain Antheaume, Grenoble (FR); Jean-Bernard Houdeline, Chirens (FR)

(73) Assignee: GE RENEWABLE TECHNOLOGIES, Grenoble (FR)

( * ) Notice: Subject to any disclaimer, the term of this patent is extended or adjusted under 35 U.S.C. 154(b) by 1036 days.

(21) Appl. No.: 14/280,902

(22) Filed: May 19, 2014

(65) Prior Publication Data
US 2014/0363280 A1 Dec. 11, 2014

(30) Foreign Application Priority Data
Jun. 5, 2013 (FR) ..................................... 13 55172

(51) Int. Cl.
*F03B 3/02* (2006.01)
*F03B 3/18* (2006.01)
*B23P 6/00* (2006.01)

(52) U.S. Cl.
CPC ............... *F03B 3/02* (2013.01); *B23P 6/002* (2013.01); *F03B 3/183* (2013.01); *F03B 3/186* (2013.01);
(Continued)

(58) Field of Classification Search
CPC .. B23P 6/002; F03B 3/02; F03B 3/183; F03B 3/186; Y02E 10/223; Y10T 29/49238
(Continued)

(56) References Cited

U.S. PATENT DOCUMENTS

| 6,926,494 B2 * | 8/2005 | Sabourin ................ F03B 3/04 29/889.1 |
| 8,882,444 B2 | 11/2014 | Williams et al. |
| 2007/0020096 A1 | 1/2007 | Enomoto et al. |

FOREIGN PATENT DOCUMENTS

| CN | 1702317 A | 11/2005 |
| CN | 102011672 A | 4/2011 |

(Continued)

OTHER PUBLICATIONS

English Translation of JP 06-137252A.*
Chinese Search Report, dated Feb. 24, 2016.

*Primary Examiner* — Mark Laurenzi
*Assistant Examiner* — Paul Thiede
(74) *Attorney, Agent, or Firm* — Dority & Manning, P.A.

(57) ABSTRACT

This method can be used for refurbishing a facility for converting hydraulic energy into electrical or mechanical energy, and vice versa. The facility includes a Francis type pump-turbine. The pump-turbine includes a runner movable about an axis, a pre-distributor, including stay vanes defining between each pair of two adjacent stay vanes a first water passage channel and a distributor, including guide vanes arranged downstream of the stay vanes in the direction of water flow feeding the pump-turbine operating in turbine mode. The guide vanes define between each pair of two adjacent guide vanes a second water passage channel. This method includes steps of reducing the height, taken parallel to the axis of rotation of the runner, of the first water passage channels and reducing the height, taken parallel to the axis of rotation of the runner, of the second water passage channels.

9 Claims, 10 Drawing Sheets

(52) U.S. Cl.
CPC ....... *Y02E 10/223* (2013.01); *Y10T 29/49238* (2015.01)

(58) Field of Classification Search
USPC .............................................. 415/186, 208.1
See application file for complete search history.

(56) References Cited

FOREIGN PATENT DOCUMENTS

| | | | |
|---|---|---|---|
| CN | 102221016 | A | 10/2011 |
| FR | 547729 | | 12/1922 |
| GB | 209005 | | 12/1923 |
| JP | S58187584 | | 11/1983 |
| JP | 06137252 | A * | 5/1994 |
| JP | 2008-057412 | | 3/2008 |
| JP | 2009092025 | | 4/2009 |
| JP | 2009092025 | A | 4/2009 |
| JP | 2010249097 | A | 11/2010 |
| JP | 2013072304 | | 4/2013 |
| SU | 629355 | A | 10/1978 |

\* cited by examiner

METHOD OF REFURBISHING AN ENERGY CONVERSION FACILITY AND REFURBISHED ENERGY CONVERSION FACILITY

CROSS-REFERENCE TO RELATED APPLICATIONS

This application claims priority to French application no. 1355172 filed Jun. 5, 2013, the contents of which are hereby incorporated in its entirety.

TECHNICAL FIELD

The invention relates to a method of refurbishing a facility for converting hydraulic energy into electrical or mechanical energy and vice versa, and such a refurbished facility.

BACKGROUND

In the field of converting hydraulic energy into electrical or mechanical energy and vice versa, the use of a Francis pump-turbine is known. Such a pump-turbine includes a runner which is movable about a vertical axis and which is rigidly connected to a drive shaft the axis of rotation of which coincides with that of the runner. This pump-turbine also includes a distributor, which is formed by a set of guide vanes arranged about the runner, and a pre-distributor, arranged between the volute and the distributor and which is formed by a set of stay vanes. In turbine mode, the distributor is arranged downstream of the pre-distributor.

The layout of the first generations of pump-turbines, e.g. pump-turbines several decades old, is strongly influenced by that of the pure Francis type turbines.

During refurbishing, it is common to change the guide vanes without physically changing the stay vanes since the stay vanes contribute to the mechanical strength of the volute and any modification of these would be tricky to implement. This change of guide vanes consists primarily in modifying their camber. The stay vanes then become too radial with respect to the flow from the guide vanes in the pump direction. It is known that this lack of incidence causes additional pressure losses adverse to the good performance of the machine.

One solution therefore consists in reducing the interior geometric angle of the stay vanes, i.e. to make it less radial. This operation would be achievable using techniques of grinding or oversizing. However, modifying the structure of the pre-distributor would risk weakening the mechanical strength of the assembly and this operation would prove difficult given the space requirement of the parts within the distributor.

In addition, the pre-distributor and the flange rings rigidly connected to the pre-distributor are mechanical parts embedded in concrete since they are key components in the mechanical dimensioning of the machine. This is because they are subject to high levels of mechanical stress. A modification in the profile of the stay vanes would therefore lead to a weakening of the structure. In addition, such an operation would be lengthy to implement and very expensive.

SUMMARY

It is these drawbacks that the invention more particularly intends to remedy by providing a method of refurbishing a Francis type pump-turbine that corrects the lack of incidence between the water flow angles in pump mode and the geometric angles of the stay vanes, without weakening the structure.

Accordingly, the invention relates to a method of refurbishing a facility for converting hydraulic energy into electrical or mechanical energy and vice versa, this facility comprising a Francis type pump-turbine, including a runner movable about an axis, a pre-distributor, including stay vanes defining between each pair of two adjacent stay vanes a first water passage channel, and a distributor, including guide vanes arranged downstream of the stay vanes in the direction of water flow feeding the pump-turbine operating in turbine mode, the guide vanes defining between each pair of two adjacent guide vanes a second water passage channel. In accordance with the invention, this method includes steps consisting in:

a) reducing the height, taken parallel to the axis of rotation of the runner, of the first water passage channels,
b) reducing the height, taken parallel to the axis of rotation of the runner, of the second water passage channels.

Thanks to the invention, in pump mode, the water flow has a direction, at the distributor outlet, which is more radial. This enables the lack of incidence between the angle of flow of the fluid and the geometric angle of the stay vanes to be corrected, without modifying the geometry of the stay vanes.

According to the advantageous but not mandatory aspects of the invention, a method of refurbishing a conversion facility may incorporate one or more of the following features, taken in any technically acceptable combination:

- The stay vanes are attached between an upper flange ring and a lower flange ring while step a) is implemented by attaching, in each first channel, a sector of a deflector on the top ring and/or on the bottom ring.
- Step b) is implemented by changing the distributor, notably by equipping the pump-turbine with a distributor the channels of which have a height, measured parallel to the axis of rotation of the runner, identical to the height of the first channels.
- The guide vanes comprise two opposing surfaces which are wetted during the passage of water and a chord equidistant from the two opposing surfaces, while the method includes a step c) subsequent to step b) consisting in adjusting the rotation of the guide vanes of the distributor about their pivoting axis in such a way that the rectilinear extension of the chord, at the level of the trailing edge of the guide vanes in pump mode, makes an angle with an orthoradial direction to the axis of rotation of the runner passing through this trailing edge which is greater than the angle defined between this rectilinear extension and this orthoradial direction before pump-turbine refurbishing, for the same operating point of the pump-turbine.
- The runner includes blades defining between each pair of two adjacent blades a third water passage channel while the method includes a step d) consisting in reducing the height of the third channels, taken at the level of the trailing edges of the flow on the blades when the pump-turbine operates in pump mode and parallel to the axis of rotation of the runner.
- Step b) is implemented by changing the runner, notably by equipping the pump-turbine with a runner of which the height of the third channels, measured parallel to the axis of rotation of the runner at the trailing edge of the blades, is identical to the height of the first and second channels.

The invention also relates to a refurbished facility for converting hydraulic energy into electrical or mechanical energy and vice versa, this facility comprising a Francis type pump-turbine, including a runner movable about an axis, a pre-distributor, including stay vanes defining between each pair of two adjacent stay vanes a first water passage channel and a distributor, including guide vanes arranged downstream of the stay vanes in the direction of water flow feeding the pump-turbine operating in turbine mode, the guide vanes defining between each pair of two adjacent guide vanes a second water passage channel. In accordance with the invention, this facility includes at least one deflector arranged on a lower flange ring and/or on an upper flange ring in each first channel.

According to the advantageous but not mandatory aspects of the invention, an energy conversion facility may incorporate one or more of the following features, taken in any technically acceptable combination:

The deflector is formed of several sectors, each arranged in a first channel and attached to the lower flange ring and/or to the upper flange ring via attachment members.

The sectors of the deflector each include a metal plate.

The sectors of the deflector each include a mass of synthetic material, concrete or metal.

BRIEF DESCRIPTION OF THE DRAWINGS

The invention will be better understood and other advantages thereof will appear more clearly in the light of the following description of a mode of embodiment of a method of refurbishing an energy conversion facility consistent with its principle, made in reference to the attached drawings in which.

DETAILED DESCRIPTION

Figure 1:
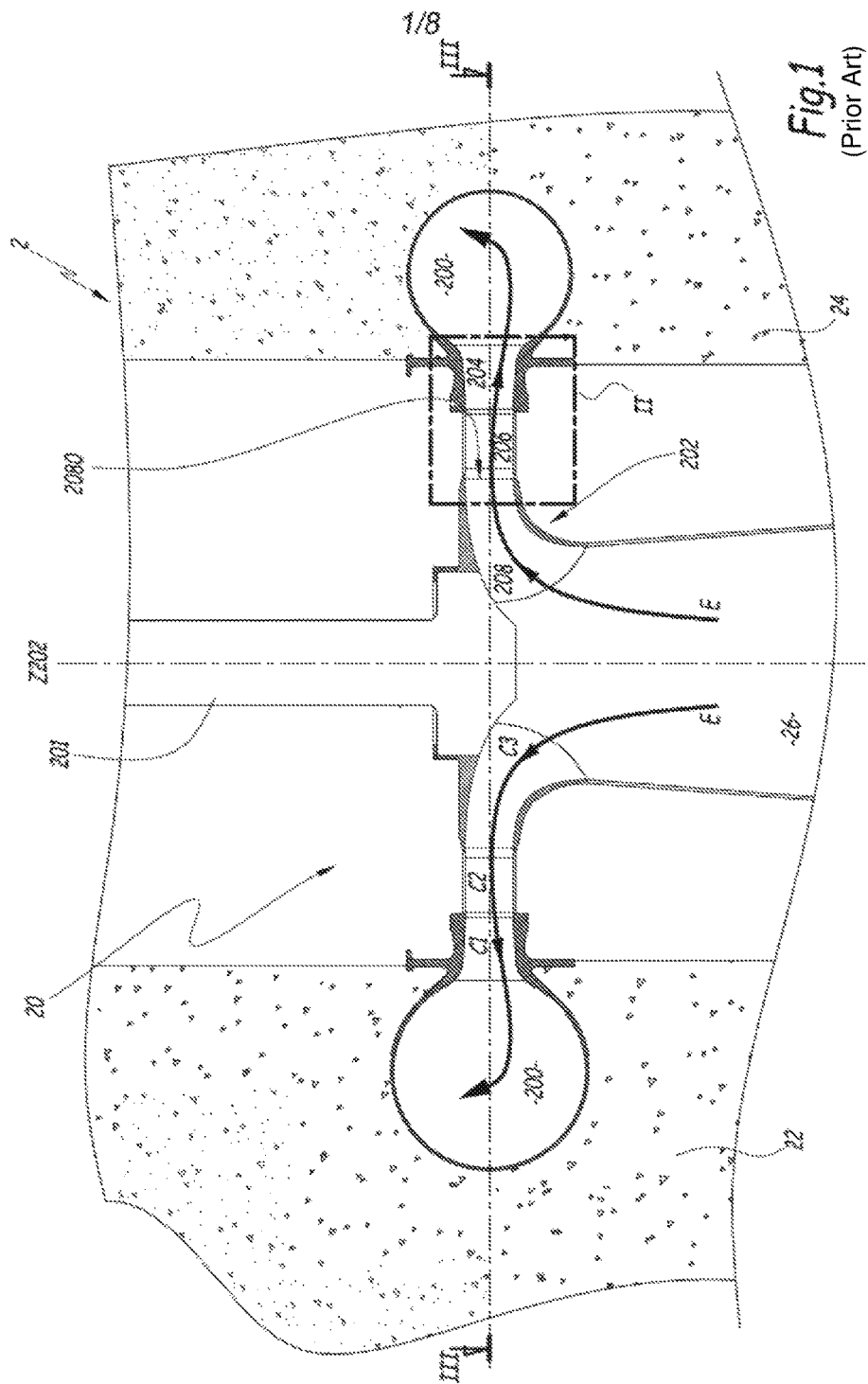
FIG. 1 is an axial section of a facility including a pump-turbine, before implementation of the method of refurbishing of the invention.
Figure 2:
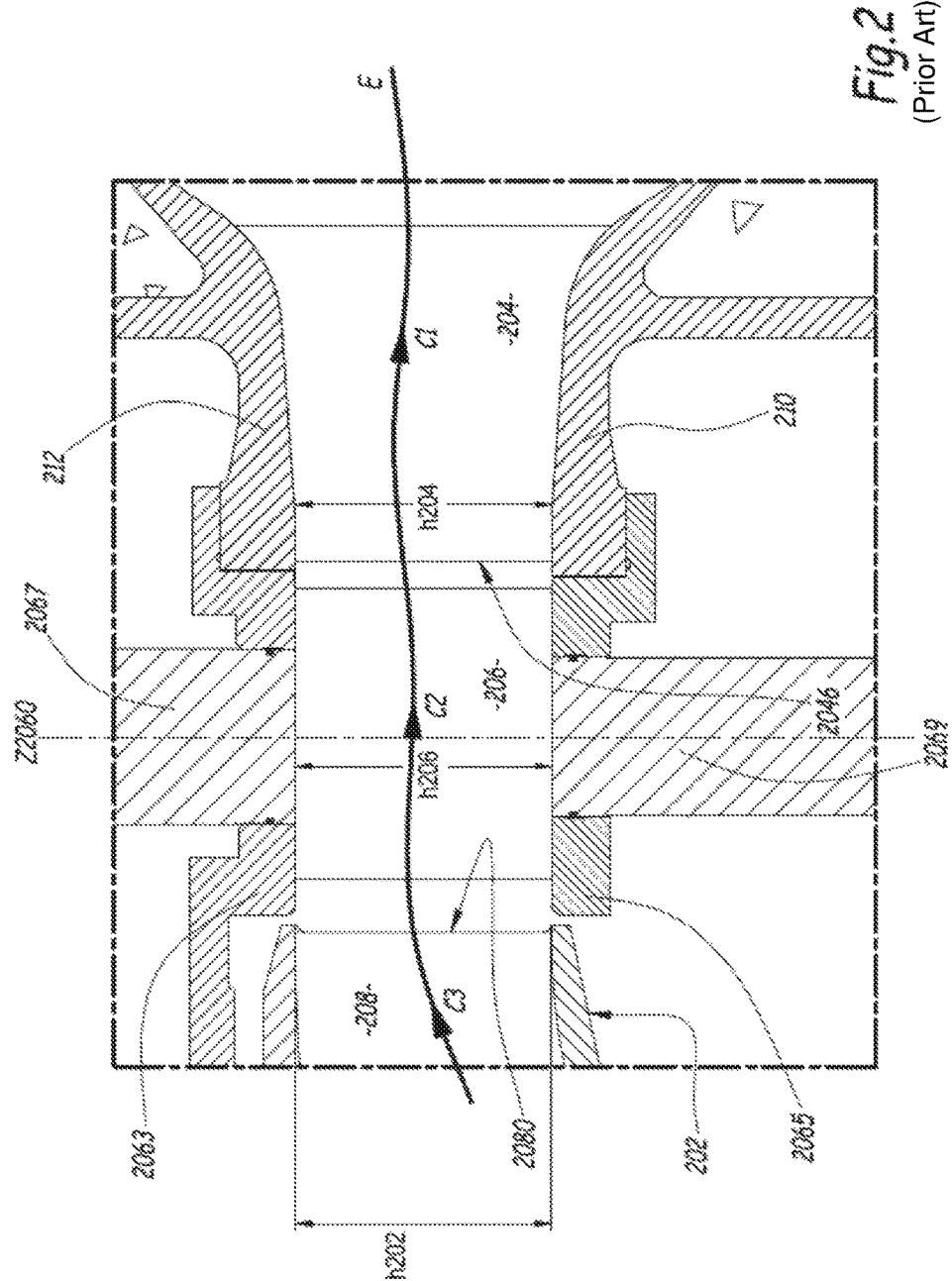
FIG. 2 is a detailed view of frame II in FIG. 1.

FIGS. 1 and 2 show a facility 2 for converting hydraulic energy into electrical or mechanical energy before its refurbishment. For the clarity of the drawing, some visible elements in FIG. 2 are not shown in FIG. 1. Conversely, the facility 2 may convert mechanical or electrical energy into hydraulic energy. The facility 2 includes a pump-turbine 20. In turbine mode, the pump-turbine 20 uses hydraulic energy for driving a drive shaft 201 in one rotation direction. The rotation of this drive shaft 201 can be used as input for another mechanical device or for driving an AC generator in order to produce electricity.

In pump mode, the rotation of a runner of the pump-turbine 20 is induced by a force applied on the shaft 201 in the opposite rotation direction, which leads to the displacement of a quantity of water in the reverse direction of flow in turbine mode. In the rest of the description, unless otherwise stated, it is considered that the pump-turbine 20 operates in pump mode.

The pump-turbine 20 includes a volute 200 which is connected to a pipe not shown and which is held in position by concrete blocks 22 and 24. This pipe is traversed by a forced water flow from a runner 202 belonging to the pump-turbine 20. This runner 202 is surrounded by the volute 200 and comprises blades 208 between which the water can circulate. The trailing edge of a blade 208 is denoted by 2080 when the pump-turbine 20 operates in pump mode. During the passage of water, the runner 202 rotates about an axis Z202 coinciding with the axis of rotation of the drive shaft 201. This passage of water is represented by flow E in FIG. 1.

When the pump-turbine 20 operates in turbine mode, the edge 2080 constitutes the leading edge of the blade to which it belongs.

A distributor 206 is arranged around the runner 202. This distributor 206 is formed by a set of guide vanes 2060 regularly distributed around the runner 202. The height of the distributor 206, measured parallel to the axis Z202, is denoted by h206. Near the running clearance, this height h206 is in fact that of the guide vanes 2060, measured vertically between two supports 2063 and 2065 between which the guide vanes 2060 are articulated, each rotating about an axis Z2060 parallel to the axis Z202. Members 2067 and 2069 called trunnions, rigidly connected to the guide vanes 2060, are respectively mounted on the supports 2063 and 2065 and are used to control the rotation of the guide vanes 2060 about the axes Z2060.

A pre-distributor 204 is arranged around the distributor 206, i.e. upstream of the distributor 206 in turbine mode and downstream thereof in pump mode. The pre-distributor 204 is formed by a set of stay vanes 2040 regularly distributed about the axis of rotation 2202 of the runner 202 and attached between a lower flange ring 210 and an upper flange ring 212. The height of the pre-distributor 204, i.e. the minimum height, measured parallel to the axis Z202, between the lower flange ring 210 and the upper flange ring 212, is denoted by h204. The height h204 is measured in the vicinity of an edge 2046 of each stay vane oriented toward the distributor 206. In pump mode, the water passes between the blades 208 of the runner 202, then between each pair of two adjacent guide vanes 2060 and finally between each pair of two adjacent stay vanes 2040. In turbine mode, the water passes between the stay vanes 2040, between the guide vanes 2060 then between the blades 208. In considering this operation in turbine mode in particular, a first water passage channel C1 is defined between two adjacent stay vanes 2040, a second water passage channel C2 between two adjacent guide vanes 2060 then a third water passage channel C3 between two adjacent blades 208 of the runner 202.

In the example in the figures, the number of first channels C1 is therefore equal to the number of stay vanes 2040. The number of second channels C2 is equal to the number of guide vanes 2060 and the number of third channels C3 is equal to the number of blades 208. In the example in the figures where the facility 2 includes sixteen stay vanes 2040 and sixteen guide vanes 2060, sixteen channels C1 and sixteen channels C2 are provided.

As a variant, the number of stay vanes 2040 may be different from the number of guide vanes 2060.

The height h204 is the height of the channels C1, whereas the height h206 is the height of the channels C2.

Figure 5:
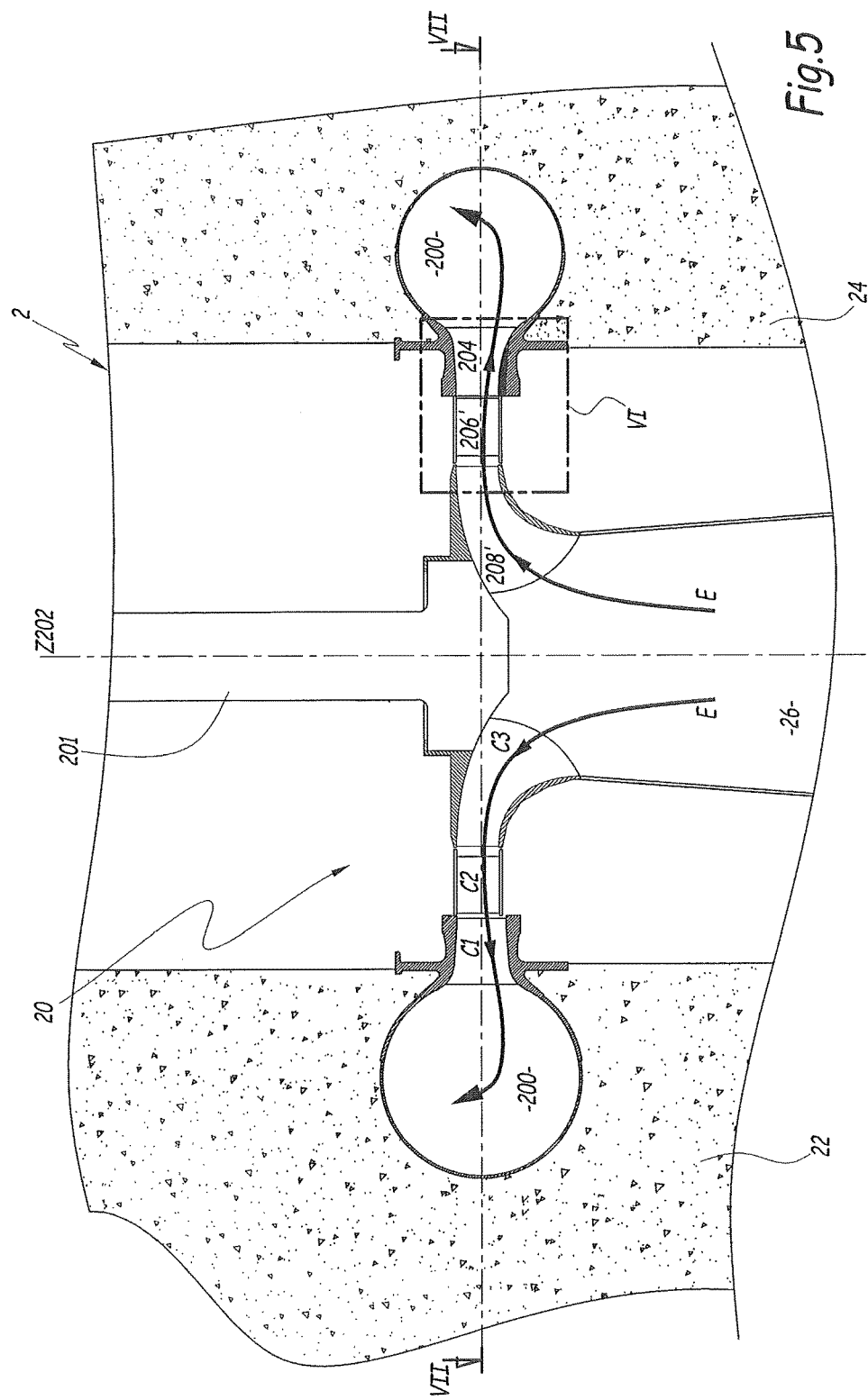
FIG. 5 is a similar section to FIG. 1 after the pump-turbine of the facility has been refurbished by the method of the invention.

A draft tube 26, visible in FIGS. 1 and 5 is arranged below the runner 202. This is used, in turbine mode, to evacuate water downstream and, in pump mode, to suck in water from a water reservoir up to the runner 202.

As the guide vanes 2060 of the distributor 206 are rotationally adjustable, each about a vertical axis Z2060 parallel to the axis of rotation Z202 of the runner 202, the orientation of the guide vanes 2060 of the distributor 206 can be used to adjust the flow entering the runner 202 in turbine mode and therefore to obtain several operating points for the pump-turbine 20.

Figure 3:
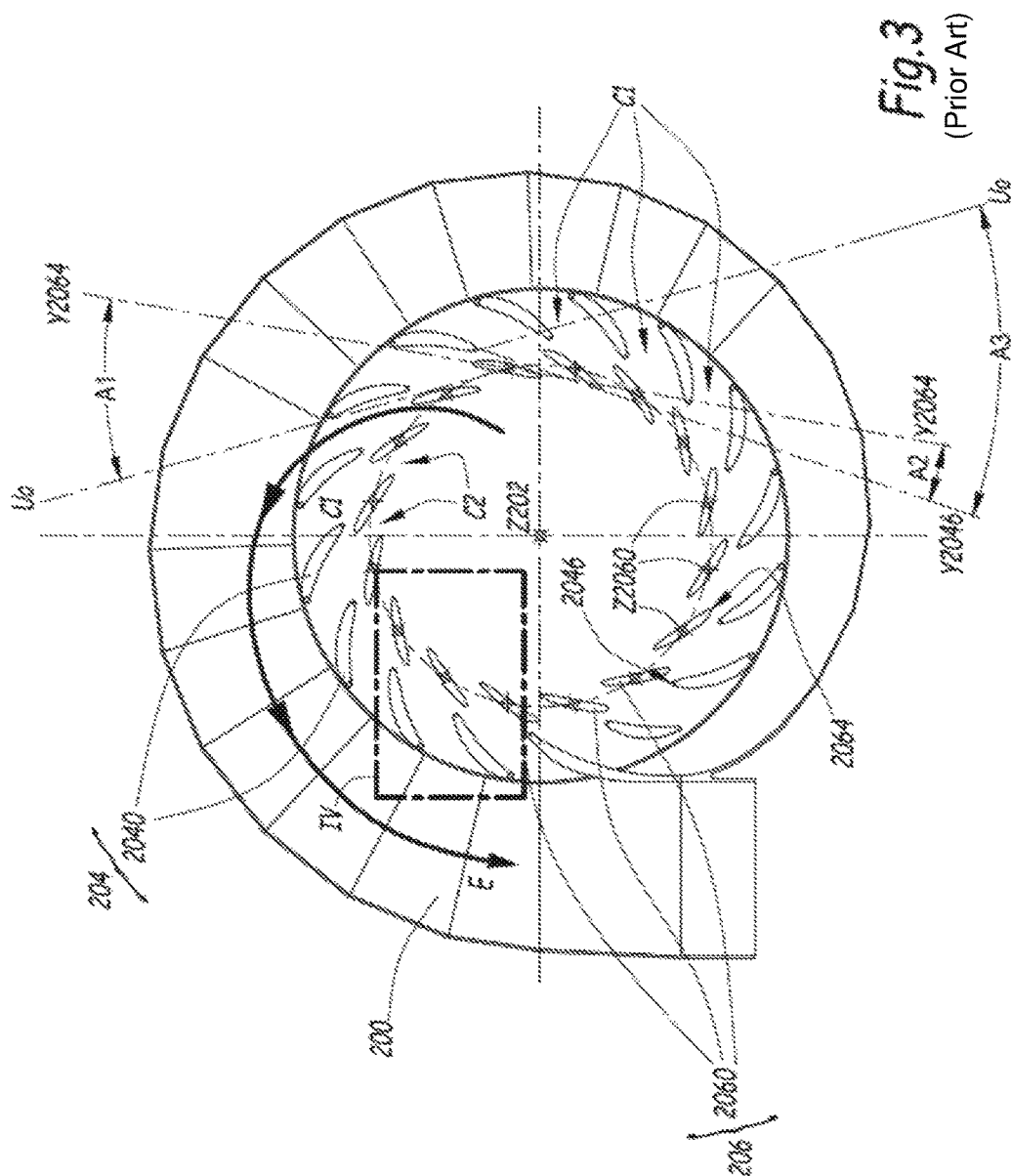
FIG. 3 is a partial section along line III-III of the facility in FIG. 1 in the case where the distributor is modified; in this figure, the pump-turbine runner and the concrete blocks are omitted and the volute is shown in external view, for the clarity of the drawing.
Figure 4:
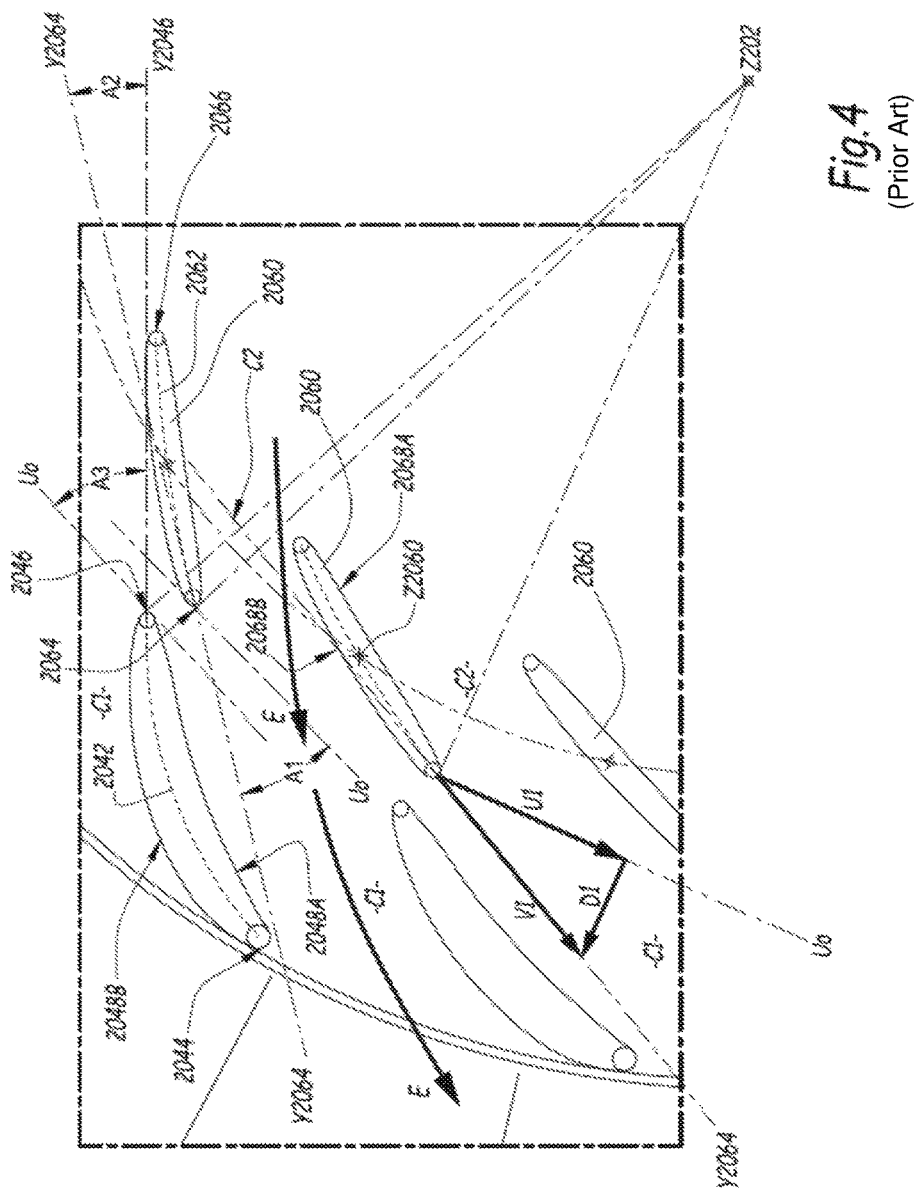
FIG. 4 is a larger scale view of frame IV in FIG. 3.

FIGS. 2 and 4 show a larger scale view of the facility in FIGS. 1 to 4 in the case where the channels C2 of the guide vanes 2060 are open to the flow by rotating the guide vanes 202 each about their vertical axis Z2060.

In the case of changing guide vanes, which mainly consists in modifying their camber, if this change alone is implemented, this approach creates a lack of incidence between the direction of flow at the distributor outlet and the direction of the stay vanes on the guide vane side.

This lack of incidence is better explained below by reference to FIGS. 3 and 4.

All the angles mentioned below are taken with respect to an orthoradial direction Uo with respect to the axis Z202.

The rotation of the guide vanes 2060 about a vertical axis Z2060 is defined as a function of the outward flow E from the runner. The absolute velocity vector of the water flow at a guide vane 2060, at the outlet of the channels C2 of the distributor 206 and at the inlet of the channels C1 of the pre-distributor 204, is denoted by $\vec{V}1$. As can be seen in FIG. 4, the vector $\vec{V}1$ has an azimuthal component $\vec{U}1$, i.e. orthoradial to the axis Z202, and an outflow component $\vec{D}1$, i.e. radial to the axis Z202 and centrifugal.

Each guide vane 2060 comprises an inner surface 2068A and an outer surface 2068B which are wetted during operation of the pump-turbine 20. For each guide vane 2060, a chord 2062 is defined which is equidistant from the two surfaces 2068A and 2068B and a trailing edge 2064 of the flow E in the pump direction. At the level of the trailing edge 2064, the chord 2062 extends along an axis Y2064 that may be described as the outlet axis of a guide vane 2060. The axis Y2064 makes an angle A1 with the orthoradial direction Uo. The vector $\vec{V}1$ is globally collinear with the axis Y2064.

Similarly, the stay vanes 2040 also comprise a leading edge 2046 defined in the pump direction, as well as an inner surface 2048A and an outer surface 2048B. During operation of the facility 2, the surfaces 2048A and 2048B are wetted. The stay vanes 2040 have also a chord 2042 which is equidistant from the surfaces 2048A and 2048B. At the level of the leading edge 2046, the chord 2042 extends along an axis Y2046 that may be described as the inlet axis on a stay vane 2040 and which defines a non-zero angle A2 with the axis Y2064 of the corresponding guide vane 2060 and an angle A3 with the orthoradial direction Uo.

As can be seen in FIGS. 3 and 4, first generation pump-turbines have stay vanes 2040 the surface 2048A of which turned toward the guide vanes 2060 is oriented substantially radially leading to significant geometric angles A3. Indeed, in reference to the attached drawings, the angle A3 is of the order of 45°, which causes the part of the stay guides 2040 turned toward the guide vanes 2060, i.e. defining the leading edge 2046, to be oriented substantially radially to the axis of rotation Z202.

In the case of changing guide vanes, which consists mainly in modifying their camber, the norm of the azimuthal component $\vec{U}1$ orthoradial to the axis Z202 is increased while the norm of the outflow component $\vec{D}1$ radial to the axis Z202 and centrifugal is preserved.

The angle A1 of the water flow direction, i.e. the angle between the axis Y2064 and the direction Uo, is therefore reduced. Thus, there is a lack of correspondence between the water flow angle A1 and the geometric angle A3 of the stay vanes 2040. This results in a lack of incidence which is shown in FIGS. 3 and 4 by the non-zero angle A2 taken between the inlet axis Y2046 of a stay vane and the outlet axis Y2064 of a facing guide vane 2060.

Figure 6:
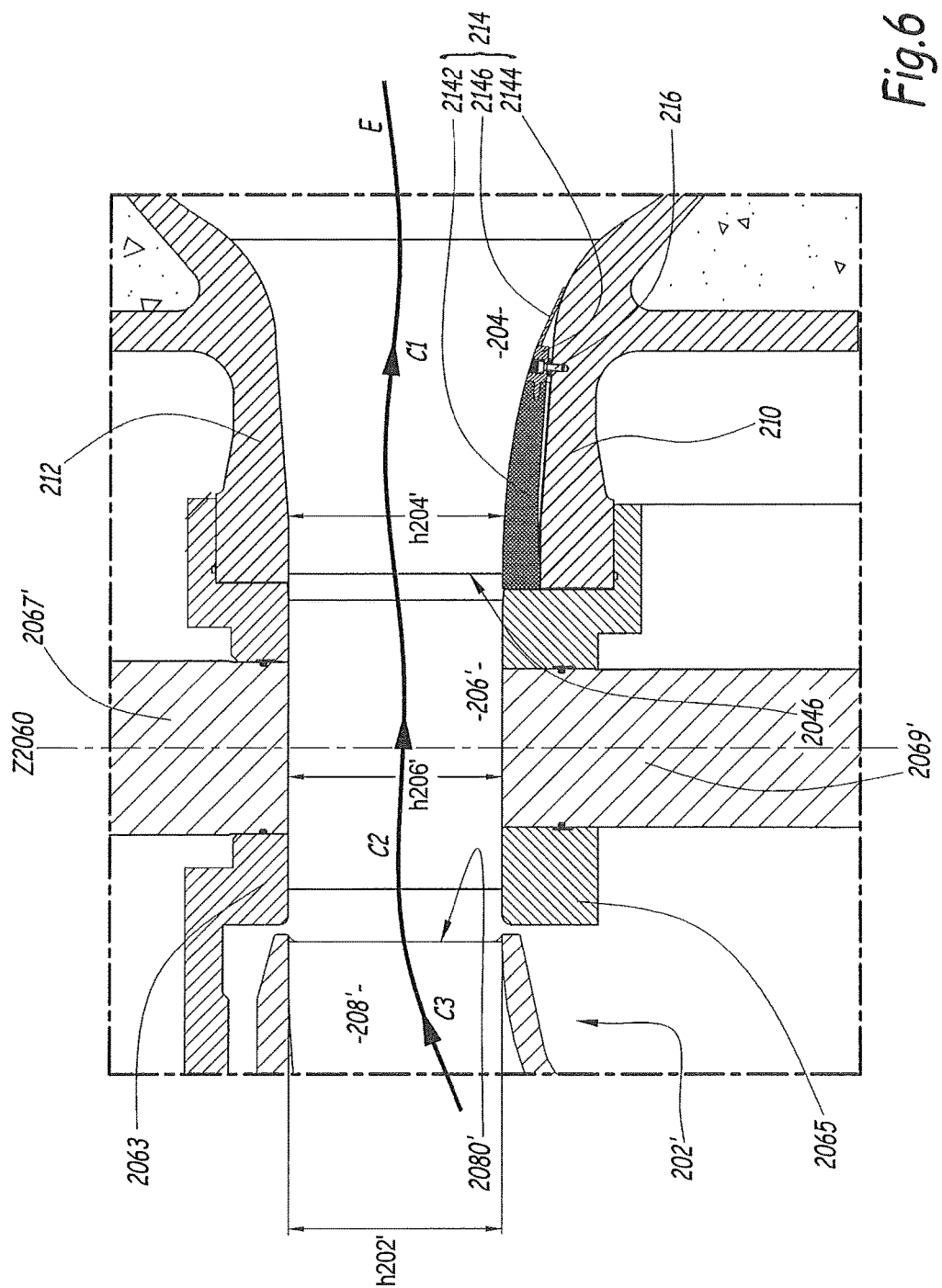
FIG. 6 is a detailed view of frame VI in FIG. 5.

The invention provides a method of refurbishing a Francis type pump-turbine for correcting this lack of incidence. FIGS. 5 to 8 show the refurbished facility 2. The elements involved in refurbishing bear their original reference followed by a prime ('), while the elements which are not involved in refurbishing bear the same reference. For the clarity of the drawing, some elements visible in FIG. 6 are not shown in FIG. 5.

Figure 7:
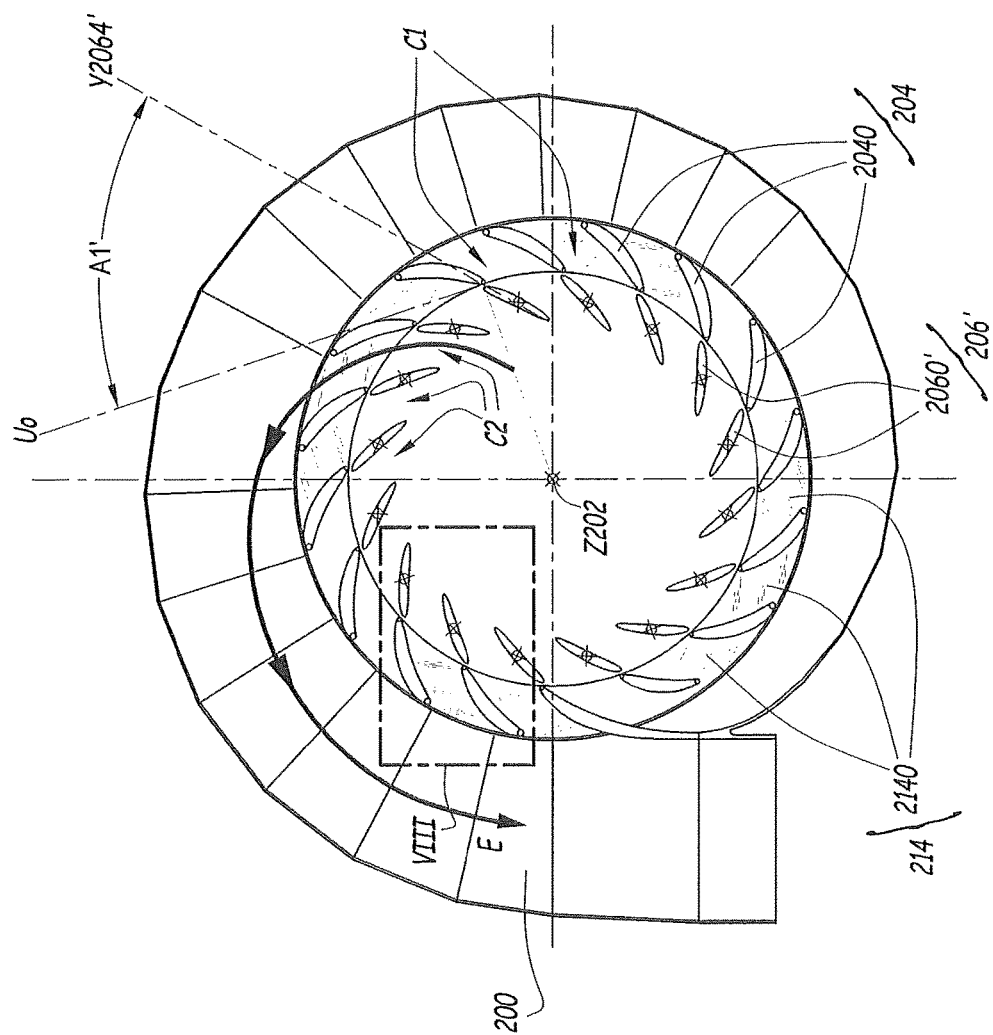
FIG. 7 is a partial section, similar to FIG. 3 and along line VII-VII in FIG. 5 of the refurbished pump-turbine.

The method of refurbishing includes a step consisting in adding a deflector 214 on the lower flange ring 210. More precisely, the deflector 214 is of annular shape centered on the axis Z202. It is composed of several sectors 2140, one of which is visible in section in FIG. 6, arranged in the first water passage channels C1. In FIG. 7, the deflector 214 is shown by a shaded area.

Each sector 2140 of the deflector 214 is each formed of a mass 2142 made of high-density polyethylene, a part 2144 made of stainless steel and a plate 2146 also formed of stainless steel. The part 2144 is arranged downstream, in the pump direction, of the mass 2142 and is rigidly connected thereto. It is attached to the lower flange ring 210 by screws 216 only one of which is visible in FIG. 6. The part 2144 is covered by the plate 2146 which extends downstream, in the pump direction, tangentially and which is welded to the lower flange ring 210.

The mass 2142 has a thickness decreasing from upstream to downstream in the pump direction. This has the advantage that, in the turbine direction, the deflector 214 does not oppose any marked resistance to the passage of water in the channel C1 and, in the pump direction, prevents an unstable flow separation with the deflector 214.

As a variant, the material of the mass 2142 may be a synthetic material other than high-density polyethylene and attachment means other than screws may be used.

The addition of this deflector 214 is used to reduce the height of the first channels C1 for the passage of flow inside the stay vane 204. Indeed, as can be seen in FIG. 6, the water no longer flows between the upper flange ring 212 and the lower flange ring 210 but between the upper flange ring 212 and the deflector 214. The height after refurbishing, denoted by h204', of each first water passage channel C1, measured parallel to the axis Z202, between the deflector 214 and the upper flange ring 212, is therefore reduced with respect to the height h204. This results in increasing the outflow component of the velocity of flow in the distributor 206'. The azimuthal component is not substantially affected by this change in height since it essentially depends on the camber given to the guide vane. The flow therefore has a more radial direction than in the facility 2 before refurbishing.

In the rest of the description, it is considered that the operating point of the pump-turbine 20 after refurbishing, i.e. in the configuration of FIGS. 5 to 8, is the same as the operating point used for the non-refurbished pump-turbine in FIG. 1 and is also identical to the operating point used after changing the guide vanes of the non-refurbished pump-turbine with guide vanes 2060' with a modified camber, as shown in FIGS. 3 and 4.

Figure 8:
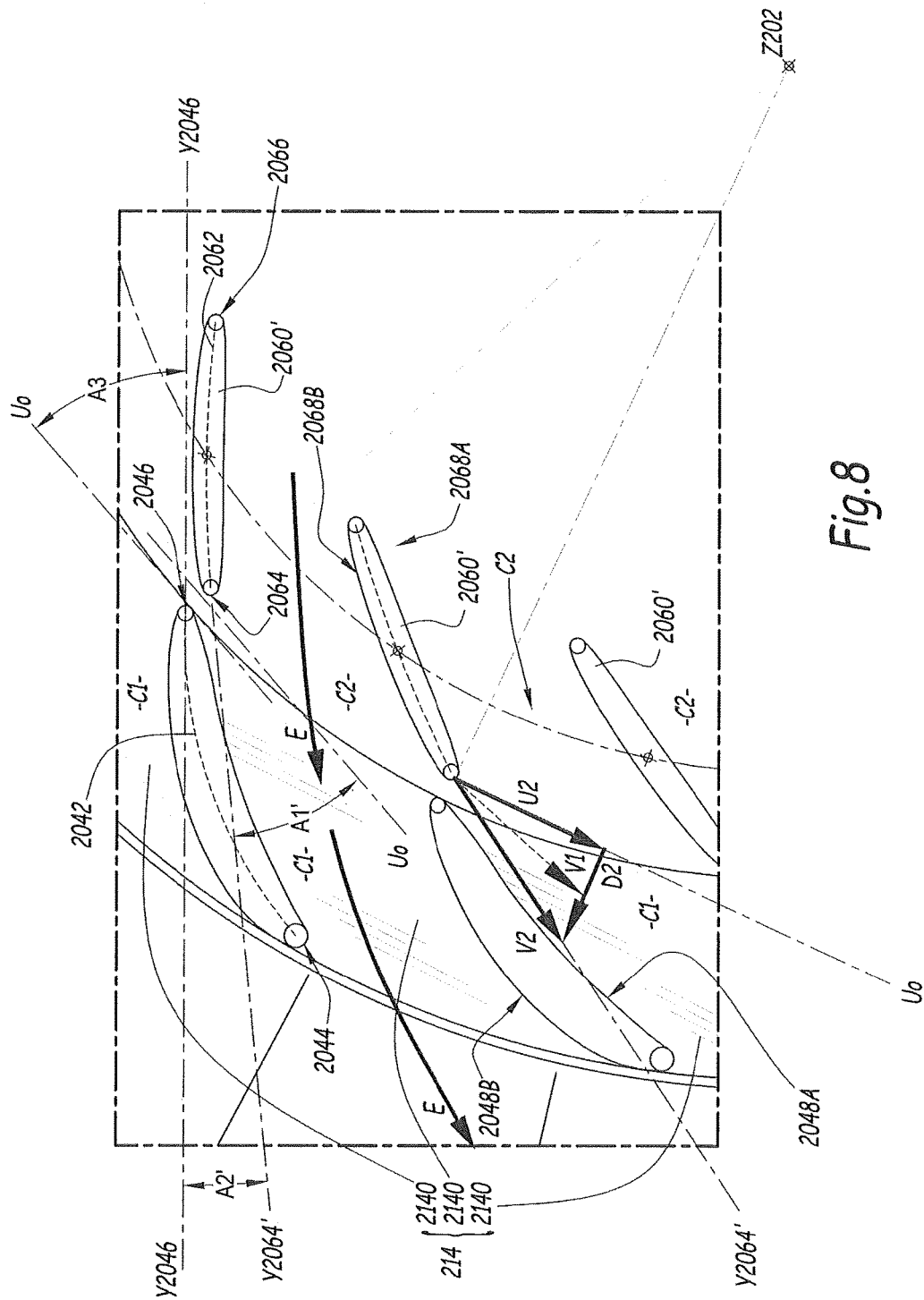
FIG. 8 is a larger scale view of frame VII in FIG. 7.

With reference to FIG. 8, the absolute velocity vector of the water flow obtained at a guide vane 2060', at the outlet of the channels C2 of the distributor 206' and at the inlet of the channels C1 of the pre-distributor 204 after refurbishing, is denoted by $\vec{V}2$. This velocity vector $\vec{V}2$ has an azimuthal component $\vec{U}2$ that is considered identical to the velocity $\vec{V}1$ component $\vec{U}1$ obtained before refurbishing since the azimuthal component is not globally affected by the change in height of the pre-distributor 204. On the other hand, the velocity $\vec{V}2$ has an outflow component $\vec{D}2$ greater than the velocity $\vec{V}1$ component $\vec{D}1$. In FIG. 8, the velocity $\vec{V}1$ is shown by the dotted line only for the purpose of comparing the water flow angles before and after refurbishing. At the level of the trailing edge 2064, the chord 2062 extends along a rectilinear axis Y2064' that may be described as the fluid outlet axis of a guide vane 2060' after refurbishing. The axis Y2046 is unchanged, as is the angle A3. An angle A1' is defined between the axis Y2064' and the orthoradial direction Uo, the angle A1' is greater than the angle A1 obtained before refurbishing. After refurbishing, the axes Y2064' and Y2046 define between them an angle A2' which is less than the angle A2 obtained before refurbishing. The lack of incidence between the guide vanes 2060' and the stay vanes 2040 is therefore reduced.

Moreover, the reduction in height of the channels C1 of the pre-distributor 204 requires the height h206 of the distributor and the height h202 of the runner 202 to be adapted. Thus, the method of refurbishing also includes steps of replacing the distributor 206 and the runner 202, notably by equipping the pump-turbine 20 with a runner 202' the channels C3 of which have a height h202', measured parallel to the axis Z202 and at the trailing edge 2080' of the blades 208' in the pump direction, identical to the height h204' of the first channels C1. Similarly, refurbishing includes a step of replacing the distributor 206 with a distributor 206' the channels C2 of which have a height h206', measured parallel to the axis Z202, identical to the height h204' of the first channels C1. This height h206' is in fact that of the guide vanes 2060', measured vertically between two supports 2063 and 2065 between which the guide vanes 2060' are articulated, each about an axis Z2060 parallel to the axis Z202. Members 2067' and 2069' called trunnions, rigidly connected to the guide vanes 2060', are respectively mounted on the supports 2063 and 2065 and are used to control the rotation of the guide vanes 2060' about the axes Z2060.

The addition of the deflector 214 in the channels C1 of the pre-distributor 204 also has the advantage of reducing the area of the wetted surfaces 2048A and 2048B of the stay vanes 2040 along which the water circulates. The flow therefore loses less head through friction with the stay vanes 2040. In addition, the fact of using a distributor 206' with a reduced height, as well as a runner 202' with a reduced height, means that the flow E passing through the runner 202' and the distributor 206' also loses less head owing to reduced friction with the solid parts. Indeed, the wetted surfaces are reduced.

As a variant not shown, the deflector 214 is in one piece and comprises housings each surrounding a stay vane 2060.

As a variant not shown, the mass 2142 of the sectors 2140 of the deflector 214 is made of concrete or is formed by a metal plate.

Figure 9:
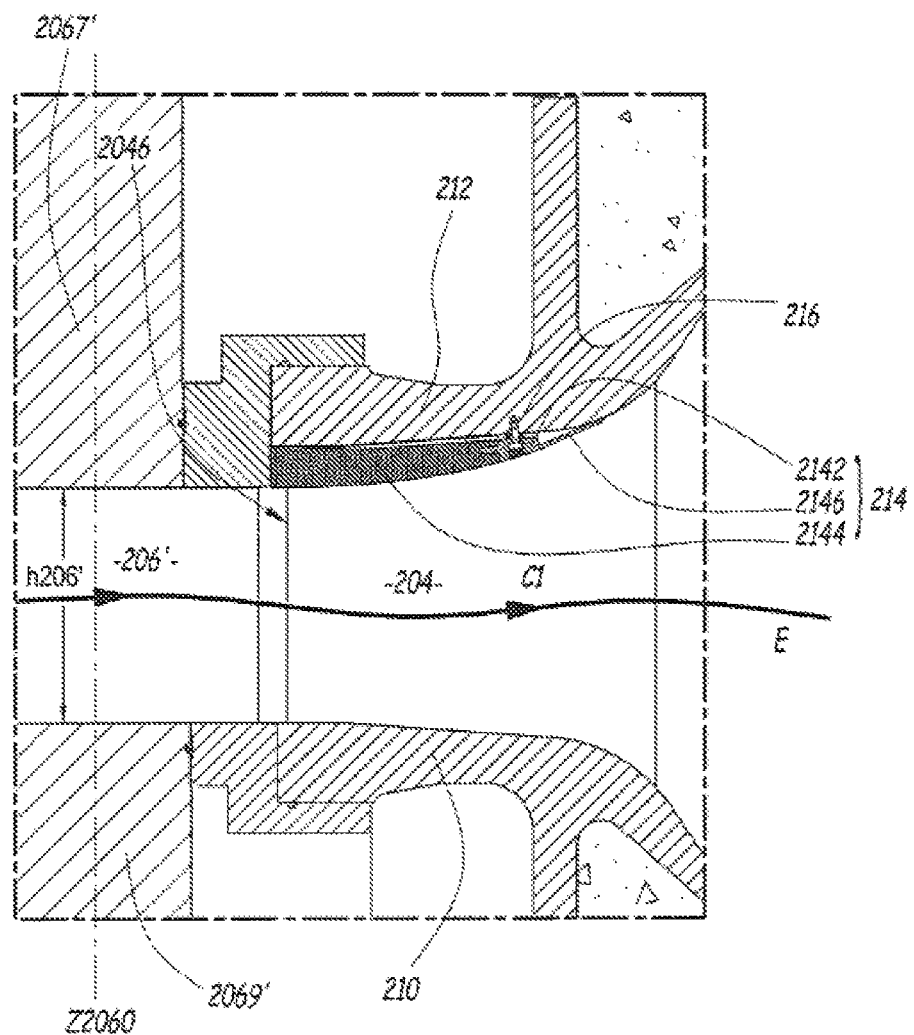
FIG. 9 is a detailed view of an alternate embodiment of the pump turbine of the facility after the pump-turbine facility has been refurbished by the method of the invention.

According to another variant, as shown in FIG. 9, the deflector 214 is attached, not on the lower flange ring 210 but below the upper flange ring 212.

Figure 10:
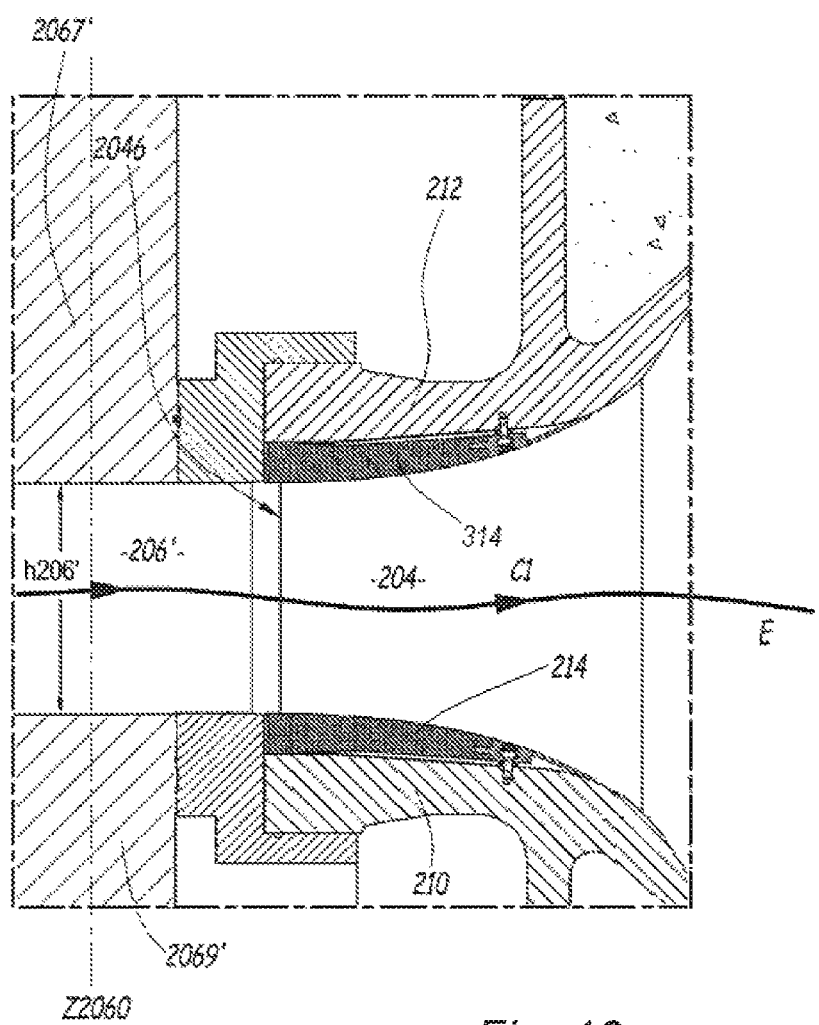
FIG. 10 is a detailed view of an another, alternate embodiment of the pump turbine of the facility after the pump-turbine facility has been refurbished by the method of the invention.

As a variant as shown in FIG. 10, the reduction in height of the first channels C1 is implemented by attaching the deflector 214 above the lower flange ring 210 and another deflector 314 below the upper flange ring 212.

The variants and modes of embodiment mentioned above can be combined to give new modes of embodiment of the invention.

The invention claimed is:

1. A method of refurbishing an existing Francis pump-turbine used in an existing facility for converting hydraulic energy into electrical or mechanical energy and vice versa into a refurbished Francis pump-turbine for use in the existing facility,
   the existing Francis pump-turbine including:
      a volute,
      an existing runner configured to be rotatable about an axis of rotation,
      a flange ring attached to the volute, the flange ring including an upper flange ring and a lower flange ring,
      an existing pre-distributor including first water passage channels having an existing first respective height,
      and an existing distributor in water flow communication with the existing pre-distributor and the existing runner, the existing distributor including second water passage channels having an existing second respective height that is different from the existing first respective height of the first water passage channels,
   the method comprising:
   a) modifying the existing pre-distributor of the existing Francis pump-turbine to have a reduced first respective height of the first water passage from the existing first respective height of the first water passage channels;
   b) removing the existing distributor from the existing Francis pump-turbine;
   c) replacing the removed existing distributor with a replaced distributor on the existing Francis pump-turbine that is different from the existing distributor, the replaced distributor including guide vanes defining second water passage channels having a respective height, the second water passage channels having water flow communication with the first water passage channels of the modified existing pre-distributor having the reduced first respective height, wherein the respective height of the second water passage channels of the replaced distributor is the same as the reduced first respective height of the first water passage channels of the modified existing pre-distributor; and
   d) completing steps a), b), and c) to form the refurbished Francis pump-turbine so that the refurbished Francis pump-turbine can be used in the existing facility instead of the existing Francis pump-turbine.

2. The method as claimed in claim 1, wherein, in each of the first water passage channels of the modified existing pre-distributor, a respective sector of the deflector is attached to the upper flange ring or the lower flange ring and/or a respective sector of another deflector is attached to the other of the upper flange ring or the lower flange ring.

3. The method as claimed in claim 1, wherein an existing angle is defined between a chord of the guide vanes of the existing distributor and a line extending in an orthoradial direction to the axis of rotation of the existing runner at an outbound edge of the guide vanes of the existing distributor, e) after step d), adjusting the rotation of the guide vanes of the replaced distributor about their pivoting axis in such a way that an angle defined between a chord of the guide vanes of the replaced distributor and the line extending in the orthoradial direction to the axis of rotation of the existing runner at an outbound edge of the guide vanes of the replaced distributor is greater than the existing angle.

4. The method as claimed in claim 1, wherein the existing runner includes blades positioned between the upper flange ring and the lower flange ring, the blades defining third water passage channels having an existing height measured parallel to the axis of rotation of the existing runner, each of the third water passage channels being defined between a respective pair of adjacent blades of the blades, the method further comprising:

f) removing the existing runner from the Francis pump-turbine; and g) replacing the removed existing runner with a replaced runner on the refurbished Francis pump-turbine that is different from the existing runner, the replaced runner being configured to rotate about an axis of rotation, wherein the replaced runner includes blades defining third water passage channels of the replaced runner having a respective height that is the same as the reduced first respective height of the first water passage channels of the modified existing pre-distributor and the respective height of the second water passage channels of the replaced distributor.

5. A facility for converting hydraulic energy into electrical or mechanical energy and vice versa, comprising:

a Francis pump-turbine that is alternately operable in a pump mode and in a turbine mode, the Francis pump-turbine including:

a volute, a runner disposed adjacent to a distributor and configured to be rotatable about an axis of rotation, a flange ring attached to the volute, the flange ring including an upper flange ring and a lower flange ring, a pre-distributor including stay vanes positioned between the upper flange ring and the lower flange ring, the stay vanes defining first water passage channels, each of the first water passage channels being defined between a respective pair of adjacent stay vanes of the stay vanes, the distributor attached to the pre-distributor and including guide vanes defining second water passage channels, each of the second water passage channels being defined between a respective pair of adjacent guide vanes of the guide vanes, the stay vanes being arranged outbound of the guide vanes in a direction of flow of water through the distributor and the pre-distributor in which the second water passage channels are in communication with the first water passage channels; and a deflector separate from the lower flange ring and the upper flange ring and attached onto at least one of the lower flange ring or the upper flange ring in each of the first water passage channels, wherein a height, measured parallel to the axis of rotation of the runner, of the first water passage channels with the attached deflector is reduced compared to a height of the first water passage channels without the attached deflector.

6. The facility as claimed in claim 5, wherein the deflector is formed of several sectors, each sector of the several sectors is arranged in a respective first water passage channel of the first water passage channels and attached to the lower flange ring or to the upper flange ring.

7. The facility as claimed in claim 6, wherein the sectors of the deflector each include a metal plate.

8. The facility as claimed in claim 6, wherein the sectors of the deflector each include a mass of synthetic material, concrete or metal.

9. The facility as claimed in claim 5, wherein a height of the second water passage channels is the same as the height of the first water passage channels with the attached deflector.

* * * * *